United States Patent
Lee et al.

(10) Patent No.: US 6,671,018 B2
(45) Date of Patent: Dec. 30, 2003

(54) LIQUID CRYSTAL DISPLAY WITH ONLY PORTION OF THE LONG AXES OF THE LIQUID CRYSTAL MOLECULES ARE ARRANGED IN RADIAL CONFIGURATION

(75) Inventors: Chang-Hun Lee, Suwon (KR); Jung-Uk Shim, Seoul (KR); Joong-Hyun Mun, Yongin (KR)

(73) Assignee: Samsung Electronics Co., Ltd., Suwon (KR)

(*) Notice: Subject to any disclaimer, the term of this patent is extended or adjusted under 35 U.S.C. 154(b) by 293 days.

(21) Appl. No.: 09/748,135

(22) Filed: Dec. 27, 2000

(65) Prior Publication Data

US 2001/0019386 A1 Sep. 6, 2001

(30) Foreign Application Priority Data

Dec. 27, 1999 (KR) .......................... 1999-62914

(51) Int. Cl.[7] ............................................. G02F 1/1337
(52) U.S. Cl. ....................................... 349/123; 349/130
(58) Field of Search ................................ 349/121, 123, 349/130

(56) References Cited

U.S. PATENT DOCUMENTS

| | | | | |
|---|---|---|---|---|
| 5,579,140 A | * | 11/1996 | Yamahara et al. | 349/124 |
| 6,061,116 A | * | 5/2000 | Nishida et al. | 349/130 |
| 6,313,899 B1 | * | 11/2001 | Wu et al. | 349/130 |
| 6,504,592 B1 | * | 1/2003 | Takatori et al. | 349/129 |

* cited by examiner

*Primary Examiner*—Robert H. Kim
*Assistant Examiner*—P. R. Akkapeddi
(74) *Attorney, Agent, or Firm*—McGuireWoods LLP

(57) ABSTRACT

Disclosed is a liquid crystal display comprising a first substrate including a first electrode; a second substrate including a second electrode, the second substrate being arranged substantially in parallel with the first substrate and with a predetermined gap therebetween; a liquid crystal layer formed by injecting liquid crystal material between the first and second substrates, long axes of liquid crystal molecules of the liquid crystal layer being arranged vertically to the first substrate and the second substrate; and first and second orientation layers formed on the first substrate and the second substrate, respectively, and providing an orientation force to the liquid crystal molecules such that the long axes of the liquid crystal molecules are slanted or twisted by 0 to 10°.

32 Claims, 7 Drawing Sheets

Applied voltage = 0

Applied voltage ≠ 0

LIQUID CRYSTAL DISPLAY WITH ONLY PORTION OF THE LONG AXES OF THE LIQUID CRYSTAL MOLECULES ARE ARRANGED IN RADIAL CONFIGURATION

BACKGROUND OF THE INVENTION (a) Field of the Invention

The present invention relates to a liquid crystal display.

(b) Description of the Related Art

Liquid crystal displays (LCDs) typically have a structure in which liquid crystal material is sandwiched between two substrates. Transparent electrodes are formed on inner surface of the substrates. An electric field applied to the liquid crystal material, controls the alignment of molecules of the liquid crystal material, thereby enabling the transmittance of incident light.

A twisted-nematic (TN) LCD includes two glass substrates which have transparent electrodes formed on the inner surface; liquid crystal material provided between the two glass substrates to form a liquid crystal layer; and first and second polarizing films provided on the outer surface of the substrates, the polarizing films acting to polarize light. In a state where no voltage is applied to the liquid crystal material, long axes of the liquid crystal molecules are roughly parallel. However, since the molecules align themselves to grooved surfaces of the substrates, by providing the substrates such that the grooves on one are perpendicular to the grooves on the other, the molecules between the substrates are twisted by 90 degrees. When a sufficient electric field is applied to the liquid crystal layer, the long axes of the liquid crystal molecules rearrange themselves vertically, allowing light to pass through untwisted.

However, with the TN liquid crystal display described above, light is not completely blocked when a voltage is not applied to the liquid crystal material. This is particularly true in the normally black mode. Accordingly, a low contrast ratio results. To remedy this problem, a vertically-aligned twisted-nematic (VATN) liquid crystal display is proposed in U.S. Pat. No. 3,914,022 ("Eurodisplay '93", pp. 158–9, Takahashi et. al.).

With the VA-TN liquid crystal display, in a state where an electric field is not applied to the liquid crystal material, the liquid crystal molecules are perpendicular to the substrates such that light is completely blocked (together with the polarizing films) when a voltage is not applied. That is, in a normally black mode, since a brightness of an off state is extremely low, a higher contrast ratio than that of the conventional TN liquid crystal display can be obtained. However, in the presence of an electric field, the liquid crystal molecules are irregularly inclined with respect to the substrates. Thus, it creates areas where the direction of the long axes of some of the liquid crystal molecules conforms to the polarizing direction of the first or second polarizing films. In such areas, the liquid crystal molecules cannot induce the rotation of the polarizing direction and the light is completely blocked by the polarizing films. Therefore, these areas appear as black on the screen, degrading picture quality.

Aperture patterns are formed on the two substrates to solve this problem so that the electric field generated between the substrates has a predetermined slantto achieve regular alignment of the liquid crystal molecules. However, it reduces the electrode area and decreases the intensity of the electric field applied to the liquid crystal molecules. Accordingly, a response speed of the liquid crystal molecules is reduced.

Further, in order to form the aperture pattern on the electrodes of the color filter substrate, the electrodes must be formed on an organic insulation layer, after which the patterning is performed. This additional process decreases productivity. Also, it is difficult to design the aperture pattern or electrode pattern that can divide the liquid crystal molecules and align them in various regions while taking into account viewing angle direction. Finally, different pixel structures require different designs.

SUMMARY OF THE INVENTION

The present invention has been made in an effort to solve the above problems.

It is an object of the present invention to provide a liquid crystal display having a wide viewing angle.

To achieve the above object, the present invention provides a liquid crystal display comprising a first substrate including first electrodes; a second substrate including second electrodes, the second substrate being arranged substantially in parallel with the first substrate and with a predetermined gap therebetween; a liquid crystal layer formed by injecting liquid crystal material between the first and second substrates, long axes of liquid crystal molecules of the liquid crystal layer being arranged vertically to the first and second substrates; and first and second orientation layers formed on the first and second substrates, respectively, and providing an orientation force to the liquid crystal molecules such that the long axes of the liquid crystal molecules are slanted or twisted 0 to 10°.

According to a feature of the present invention, orientation directions of the first and second orientation layers are identical.

According to another feature of the present invention, orientation directions of the first and second orientation layers are different.

According to yet another feature of the present invention, the liquid crystal layer has a negative dielectric anisotropy.

According to still yet another feature of the present invention, a polarizing film for polarizing light is provided on outer surfaces of each of the first and second substrates.

According to still yet another feature of the present invention, a light transmission axis of the polarizing film on the first substrate is either perpendicular or parallel to a light transmission axis of the polarizing film on the second substrate.

According to still yet another feature of the present invention, the first electrodes are patterned in a slit configuration in a single direction.

According to still yet another feature of the present invention, the first electrodes are arranged in a direction corresponding to an orientation direction of the liquid crystal molecules.

According to still yet another feature of the present invention, the first electrodes are arranged in a direction that is different from an orientation direction of the liquid crystal molecules.

According to still yet another feature of the present invention, an angle between a longitudinal direction of the first electrodes and the orientation direction of the liquid crystal molecules is 0 to 10°.

According to still yet another feature of the present invention, the first electrodes are pixel electrodes for transmitting image signals, and are formed in each unit pixel area.

According to still yet another feature of the present invention, the liquid crystal display further comprises thin film transistors, the thin film transistors including gate lines for transmitting scanning signals; data lines for transmitting image signals, the data lines being insulated from and intersecting the gate lines to form pixel regions; gate electrodes provided at areas where the gate lines and data lines cross, the gate electrodes being connected to the gate lines; source electrodes connected to the data lines; and drain electrodes connected to the pixel electrodes.

According to still yet another feature of the present invention, the pixel electrodes are formed on a same layer as the gate lines or data lines.

According to still yet another feature of the present invention, the pixel electrodes are made of a transparent conductive material such as indium tin oxide or indium zinc oxide, or are made of a non-transparent conductive material.

According to still yet another feature of the present invention, the pixel electrodes are arranged in the same direction as the data line or gate lines.

According to still yet another feature of the present invention, protrusions are formed on the first substrate and/or the second substrate to provide a pretilt angle to the liquid crystal molecules.

According to still yet another feature of the present invention, an angle between a surface of the protrusions and a surface of the first and/or second substrate is 2 to 45°.

According to still yet another feature of the present invention, the protrusions are formed on corresponding areas of the first and second substrates in the case where the protrusions are provided on both substrates.

According to still yet another feature of the present invention, a chiral additive is included in the liquid crystal material forming the liquid crystal layer.

According to still yet another feature of the present invention, the first and second electrodes are made of a transparent conductive material such as indium tin oxide or indium zinc oxide, or are made of a non-transparent conductive material.

In another aspect, the present invention provides a liquid crystal display comprising a first substrate and a second substrate, the second substrate being arranged substantially in parallel with the first substrate and with a predetermined gap therebetween; a liquid crystal layer formed by injecting liquid crystal material between the first and second substrates, long axes of liquid crystal molecules of the liquid crystal layer being arranged vertically to the first and second substrates at an initial state; and means for varying an alignment of the long axes of the liquid crystal molecules, wherein at least two adjacent regions with respect to a line parallel to the first and second substrates are formed by the liquid crystal layer, and the regions are formed symmetrically with respect to the line by the means.

According to a feature of the present invention, at least two adjacent regions with respect to a line vertical to the first and second substrates are formed by the liquid crystal layer, and the regions are formed symmetrically with respect to the line by the means.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1A:
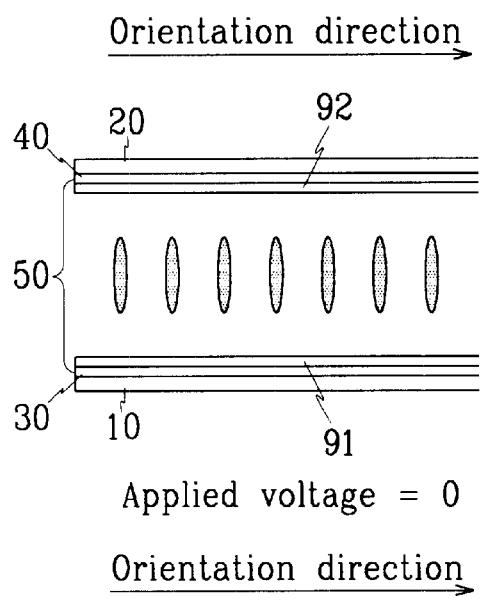
FIGS. 1a and 1b are schematic sectional views of a liquid crystal display according to a first preferred embodiment of the present invention.
Figure 1B:
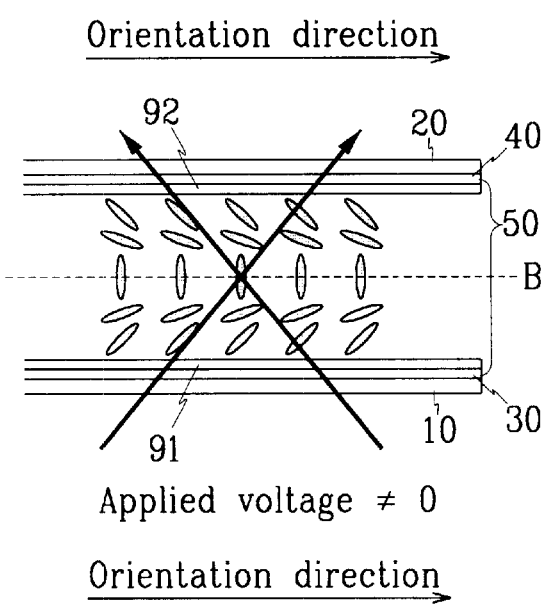

FIGS. 1a and 1b are schematic sectional views of a liquid crystal display according to a first preferred embodiment of the present invention.

As shown in the drawings, a lower glass substrate 10 and an upper glass substrate 20 are arranged substantially in parallel with a predetermined gap therebetween, and orientation layers 91 and 92 are formed on the lower and upper glass substrates 10 and 20, respectively. Formed on inner surfaces of the lower and upper substrates 10 and 20 are a first electrode 30 and a second electrode 40, respectively. Further, liquid crystal material is injected between the lower and upper substrates 10 and 20 to form a liquid crystal layer 50.

Without a voltage applied, long axes of the liquid crystal molecules are arranged perpendicular to the substrates 10 and 20 as shown in FIG. 1a. However, when a sufficient voltage is applied to the first and second electrodes 30 and 40, the orientation layers 91 and 92 twist the liquid crystal molecules in the direction as shown in FIG. 1b. The arrows (→) in FIG. 1b indicate an orientation direction. When a voltage is not applied to the first and second electrodes 30 and 40, the orientation layers 91 and 92 may be designed to arrange the liquid crystal molecules perpendicular to the substrates 10 and 20.

The first and second electrodes 30 and 40 can be a transparent conductive material such as indium tin oxide (ITO) or indium zinc oxide (IZO), or can be a non-transparent conductive material. A polarizing film (not shown) for polarizing light can be attached to outer surfaces of each of the substrates 10 and 20. It is preferable that a light transmission axis of the polarizing film provided on the lower glass substrate 10 is perpendicular to a light transmission axis of the polarizing film provided on the upper glass substrate 20. However, it is possible for the light transmission axes of the polarizing films to be parallel.

Generally, the first electrode 30 is a pixel electrode for applying a different data signal to each pixel, and the second electrode 40 is a common electrode for applying a common signal to all the pixels. Further, one terminal of each pixel electrode is connected to a switching element such as a thin film transistor. A thin film transistor is provided in each pixel region. This structure will be described in more detail hereinbelow.

The liquid crystal material of the liquid crystal layer 50 has a dielectric anisotropy $\Delta\epsilon$ of less than 0. For the liquid crystal material, it is possible to use a nematic liquid crystal material, a chiral nematic liquid crystal material, or a liquid crystal material having mixed therein a dextrorotatory or levorotatory chiral additive.

As shown in FIG. 1a, when a voltage is not applied, the long axes of the liquid crystal molecules of the liquid crystal layer 50 are arranged perpendicular to the substrates 10 and 20 as a result of the orienting force of the orientation layers 91 and 92 and/or a result of the intrinsic characteristic of the liquid crystal material. At this time, light passing through the lower glass substrate 10, liquid crystal layer 50, and upper glass substrate 20 is not polarized, and instead passes straight through these elements.

If the light transmission axes of the two polarizing films are parallel, the light passes through the polarizing films without altering its polarizing direction, rendering a white state. However, if the light transmission axes of the polarizing films provided on the outside surfaces of the substrates 10 and 20 are arranged perpendicular to one another, the light is blocked by the polarizing films such that a dark state results. At this time, since a completely dark state is displayed by the normally black mode LCD, which operates to display a dark state when no voltage is applied, a high contrast ratio is obtained and a film for realizing a dark state is not needed.

As shown in FIG. 1b, if a sufficient voltage is applied to the first and second electrodes 30 and 40, an electric field that is perpendicular to the substrates 10 and 20 is formed therebetween. At this time, since the liquid crystal layer 50 has a negative dielectric anisotropy, the long axes of the liquid crystal molecules attempt to align themselves perpendicular to the electric field. However, since the orientation force of the orientation layers 91 and 92 is greater than the force of the electric field in areas close to the two substrates 10 and 20, the liquid crystal molecules in these regions attempt to maintain their original positions. Accordingly, the direction of the liquid crystal molecules varies continuously in an attempt to realize an equilibrium between the force of the electric field and the force of the orientation layers 91 and 92.

Accordingly, as shown in FIG. 1b, the liquid crystal molecules are slanted or twisted such that the liquid crystal molecules are arranged symmetrically on both sides of a center line B to form two regions, the center line B being positioned at approximately a center location between the two substrates 10 and 20 and parallel to the same. As a result, a phase retardation of the light passing through the liquid crystal layer 50 is symmetrically compensated for so that the viewing angle is increased.

The liquid crystal molecules can form a non-moving layer at the center line B. That is, the liquid crystal molecules are symmetrically arranged on both sides of the center line B, and the light transmitted diagonally with respect to the center line B follows paths realized by the identical arrangement of the liquid crystal molecules. As a result, a retardation of the light is also roughly identical in all areas such that a wide viewing angle is achieved.

Figure 2:
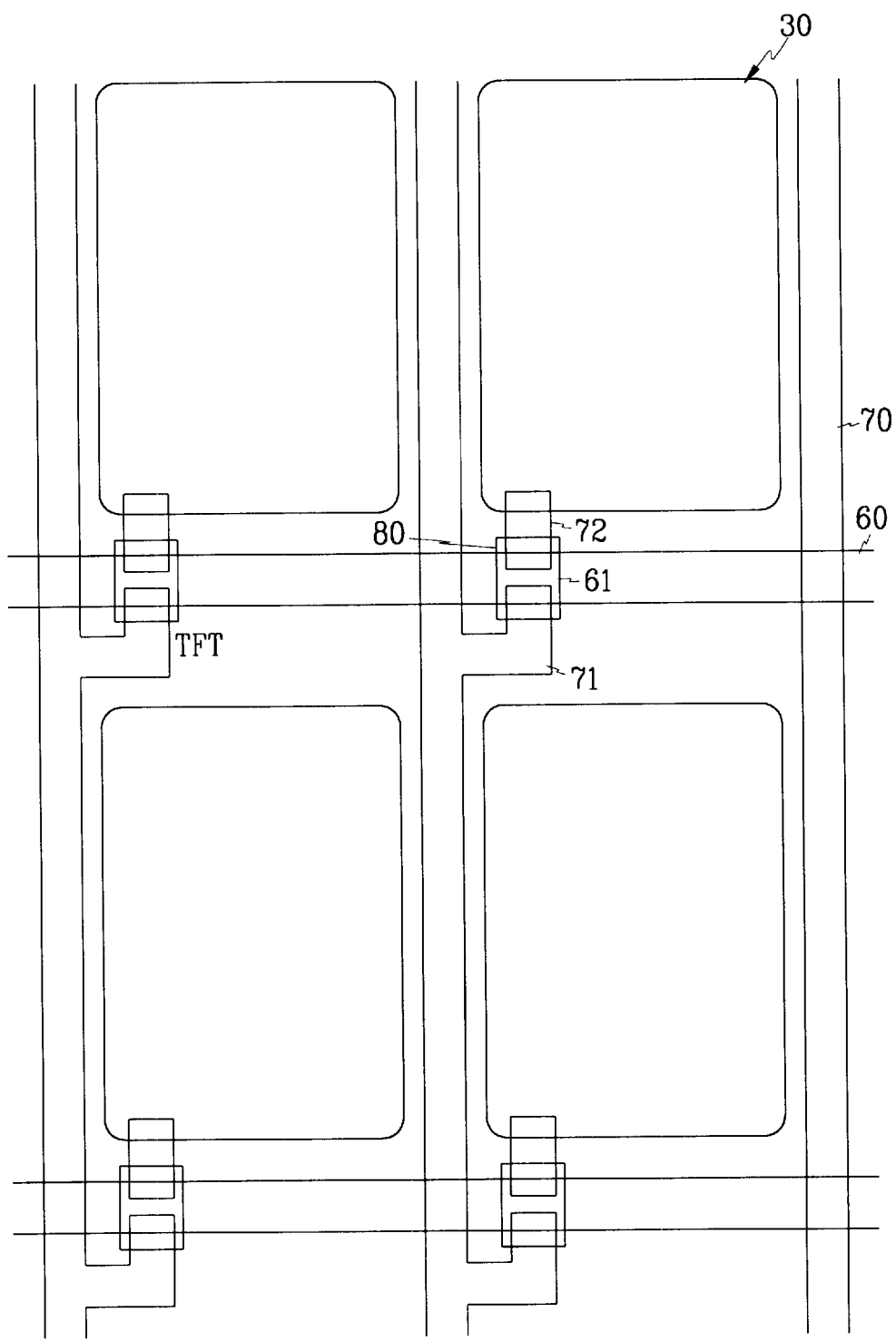
FIG. 2 is a schematic view of a thin film transistor substrate for a liquid crystal display according to a first preferred embodiment of the present invention.

A unit pixel structure of a thin film transistor substrate for a LCD in which the first and second electrodes 30 and 40 are respectively a pixel electrode and a common electrode will now be described with reference to FIG. 2.

As shown in the drawing, formed on a thin film transistor substrate for an LCD are a plurality of gate lines 60 for transmitting scanning signals, and a plurality of data lines 70 for transmitting image signals. The gate lines 60 intersect the data lines 70 to form pixel regions, the gate lines 60 being insulated from the data lines 70. A thin film transistor (TFT) is provided at areas where the gate lines 60 and data lines 70 cross. Each TFT includes a gate electrode 61, a source electrode 71 that is connected to a data line 70, a drain electrode 72, and a semiconductor layer 80.

Formed in each pixel region is a pixel electrode 30 that is electrically connected to a corresponding drain electrode 72 to transmit image signals. The pixel electrodes 30 can be formed both on the same layer as the elements 60 and 61 or the elements 70, 71, and 72, or on a separate layer. Also, the pixel electrodes 30 can be a transparent conductive material such as indium tin oxide (ITO) or indium zinc oxide (IZO), or can be a non-transparent conductive material. In addition, an insulation layer made of silicon nitride, silicon oxide, or an organic insulating material can be provided between the elements 60, 61, 70, 71 and 72, and the pixel electrode 30.

In order to obtain a greater and more uniform viewing angle, it is preferable that the direction of arrangement of the liquid crystal molecules is different in each pixel or small region. Protrusions are used in the present invention for this purpose.

Figure 3A:
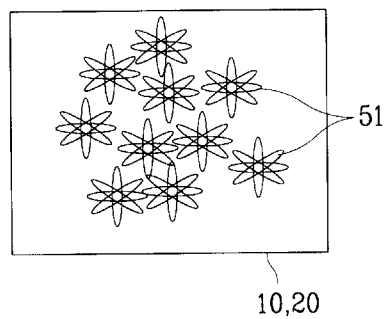
FIGS. 3a–4b are schematic views used to describe a protrusion pattern of a liquid crystal display according to a first preferred embodiment of the present invention.
Figure 3B:
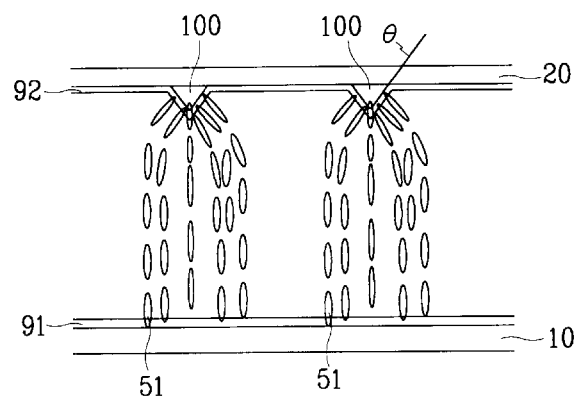
Figure 4A:
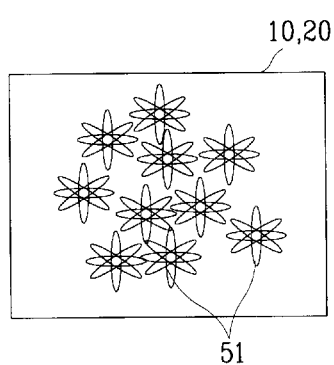
Figure 4B:
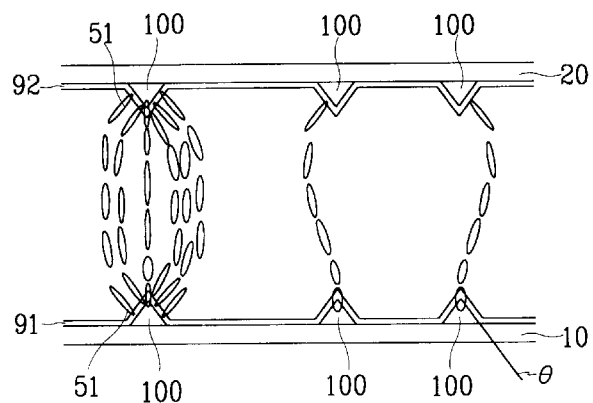

FIGS. 3a–4b are schematic views used to describe a protrusion pattern of the liquid crystal display. FIGS. 3a and 4a show a plan view of the arrangement of the liquid crystal molecules 51 as a result of a protrusion pattern, and FIGS. 3b and 4b show sectional views of the LCD and correspond respectively to FIGS. 3a and 4a. In FIGS. 3a and 3b, protrusions are formed on only one of the two substrates 10 and 20, while in FIGS. 4a and 4b, protrusions are formed on both the substrates 10 and 20. The pixel electrode 30 and the common electrode 40 do not appear in FIGS. 3a–4b.

As shown in the drawings, protrusions 100 are randomly formed on either or both of the substrates 10 and 20. The orientation layers 91 and 92 are formed over the protrusions 100. At a predetermined distance from the protrusions 100, long axes of the liquid crystal molecules 51 are perpendicular to the substrates 10 and 20. However, at areas approaching the protrusions 100, the long axes of the liquid crystal molecules 51 align themselves to be perpendicular to surfaces of the protrusions 100 rendering a pre-tilt arrangement. Accordingly, when viewed from an opposing side of the substrates 10 and 20 on which the protrusions 100 are formed as in FIGS. 3a and 4a, the liquid crystal molecules 51 extend outwardly in all directions at each protrusion 100.

The protrusions 100 can be made of silicon nitride, silicon oxide, or an organic insulating material. When the protrusions 100 are made of an organic insulating material, the protrusions 100 can be formed using only one photographic process. The protrusions 100 may be formed on top of the electrodes 30 and 40 of FIGS. 1a and 1b. Also, when the protrusions 100 are formed on both the substrates 10 and 20, the protrusions 100 may be formed at either corresponding or different locations on the substrates 10 and 20. The protrusions 100 may be formed at different intervals and sizes. Preferably, there are from several to several tens of protrusions 100 formed in each pixel region.

To obtain a pretilt angle, it is preferable that an angle of inclination $\theta$ of a surface of the protrusions 100 is from between 2 to 45° with respect to a surface of the substrates 10 and 20. Further, some of the liquid crystal molecules 51 may be non-uniformly arranged as shown in FIG. 4b. A dextrorotatory or levorotatory chiral additive may be included in the liquid crystal material so that the liquid crystal molecules 51 uniformly arrange when a voltage is applied.

In the liquid crystal display of the present described above, a uniform viewing angle can be obtained as a result of the projecting arrangement of the liquid crystal molecules 51 at the protrusions 100. Accordingly, since there are no areas where the brightness abruptly decreases regardless of the angle from which the display is viewed, gray inversion problems are not encountered. Further, since a rubbing process to obtain a partitioned orientation of the liquid crystal molecules 51 is not required, defects arising from the rubbing process can be avoided.

The pixel electrodes 30 formed on the lower substrate 10 can be formed in a slit configuration so that a fringe field is generated when a voltage is applied. It is preferable that a direction of arrangement of the pixel electrodes 30 is identical to the orientation direction. This will be described in more detail hereinbelow.

Figure 5:
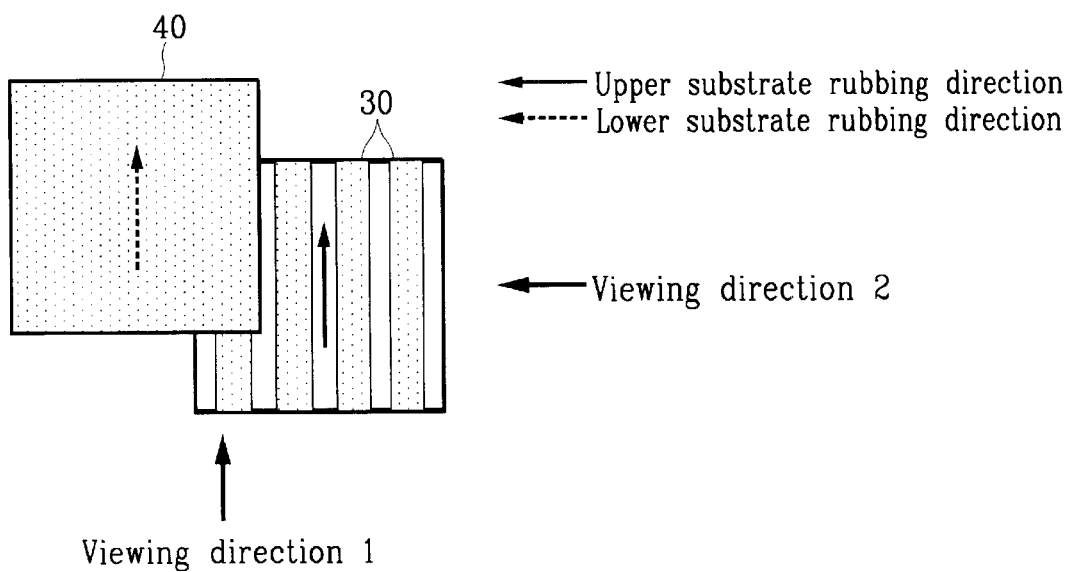
FIG. 5 is a schematic plan view of a first and second electrode structure according to a second preferred embodiment of the present invention.

FIG. 5 shows a schematic plan view of a first and second electrode structure according to a second preferred embodiment of the present invention.

As with the first embodiment, reference numeral 30 indicates a first electrode, a plurality of which are uniformly formed on one substrate, and reference numeral 40 indicates a second electrode, a plurality of which are formed on an opposing substrate. Arrows (-->, —>) indicate an orientation direction for slanting or twisting long axes of the liquid crystal molecules 51 from their perpendicular arrangement between the substrates 10 and 20 when a sufficient voltage is applied to the first and second electrodes 30 and 40. As shown in FIG. 5, the orientation direction of the long axes of the liquid crystal molecules 51 corresponds to a longitudinal direction of the first electrode 30 (vertical in the drawing). Here, it is possible for all the orientation directions (-->, —>) to be within 0–10° from the longitudinal direction of the first electrode 30, and they can all be identical or a mixed variety of angles within this range.

Figure 6A:
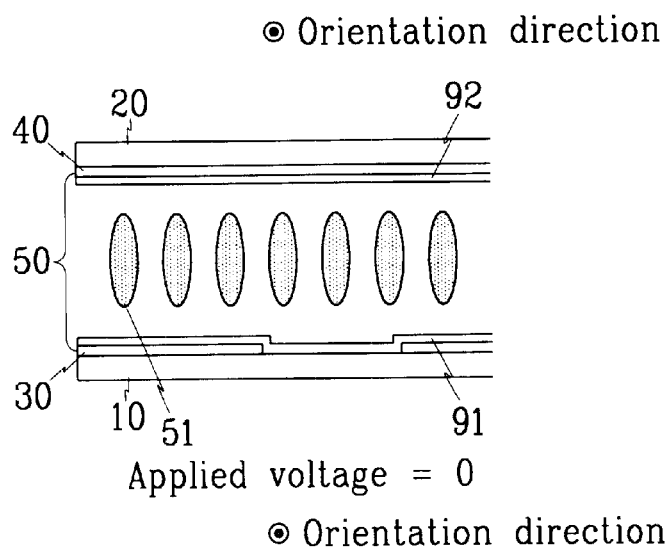
FIGS. 6a–7b are schematic sectional views of a liquid crystal display according to a second preferred embodiment of the present invention used to describe drive principles of the same.
Figure 6B:
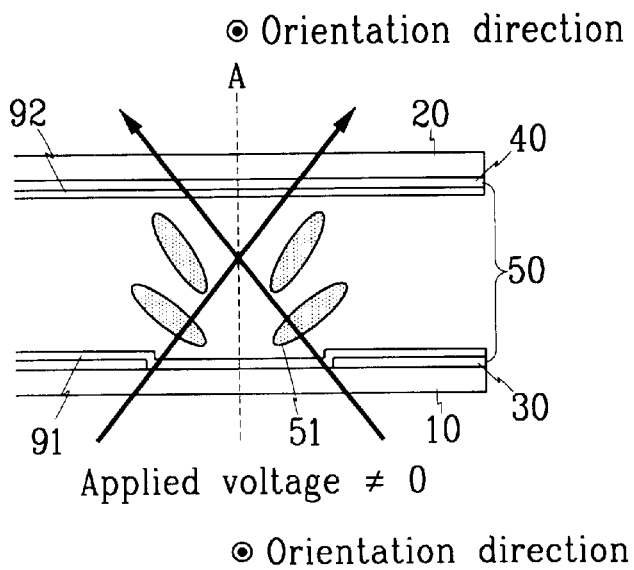
Figure 7A:
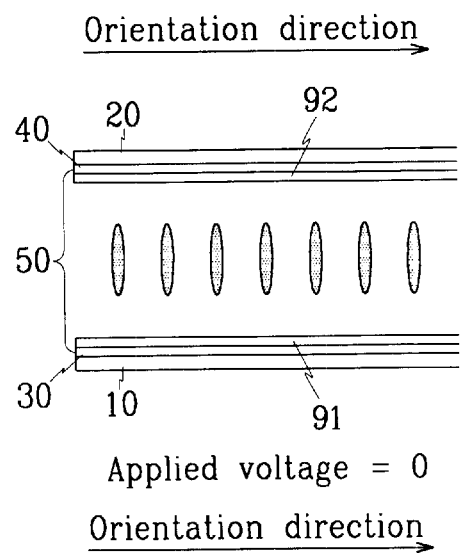
Figure 7B:
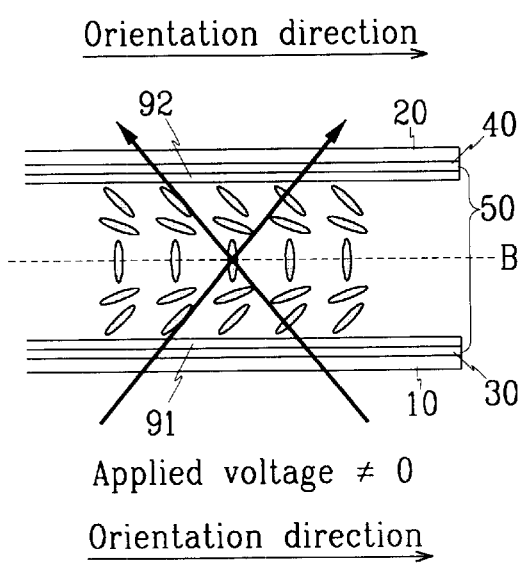

A structure of the first and second electrodes 30 and 40 described above, and that of a liquid crystal display according to a second preferred embodiment of the present invention will now be described with reference to FIGS. 6a–7b. Because of the similarity of structure between the first and second embodiments, the same reference numerals are used. FIGS. 6a and 6b are sectional views of a liquid crystal display in which the LCD is cut along a direction perpendicular to viewing direction 1 of FIG. 5, and FIGS. 7a and 7b are sectional views of a liquid crystal display in which the LCD is cut along a direction perpendicular to viewing direction 2 of FIG. 5. FIGS. 6a and 7a show an alignment state of the liquid crystal molecules 51 when no voltage is applied to the first and second electrodes 30 and 40. FIGS. 6b and 7b show an alignment state of the liquid crystal molecules 51 when a sufficient voltage is applied to the first and second electrodes 30 and 40.

As described above, the first and second embodiments are similar in structure. However, as shown in FIG. 5, the first electrodes 30 of the second embodiment are formed on the lower substrate 10 at a predetermined width and extending the length of the lower substrate 10, and at predetermined intervals. The symbols ⊙ and → in FIGS. 6a–7b indicate an orientation direction.

In the second embodiment, as with the first embodiment, the first electrodes 30 are pixel electrodes for applying a different data signal to each pixel, and the second electrodes 40 are common electrodes for applying a common signal to all the pixels. It is preferable that each of a width and interval of the first electrodes 30 is 3–7 μm.

The operation of the LCD of the second preferred embodiment of the present invention will now be described.

As shown in FIGS. 6a and 7a, when a voltage is not applied, the long axes of the liquid crystal molecules 51 of the liquid crystal layer 50 are arranged perpendicular to the substrates 10 and 20 as a result of the orienting force of the orientation layers 91 and 92 and/or a result of the intrinsic characteristic of the liquid crystal material. Accordingly, the same effects as in the first embodiment are realized.

As shown in FIGS. 6b and 7b, if a sufficient voltage is applied to the first and second electrodes 30 and 40, an electric field that is substantially perpendicular to the substrates 10 and 20 is formed therebetween, and fringe fields are formed between the first electrodes 30. That is, a first electric field E1 is formed perpendicular to the first and second substrates 10 and 20, and between the first and second electrodes 30 and 40. However, at locations corresponding to the gaps between the first electrodes 30, a second electric field E2 that is skewed from the direction perpendicular to the substrates 10 and 20 is formed.

At this time, since the liquid crystal layer 50 has a negative dielectric anisotropy, the long axes of the liquid crystal molecules 51 attempt to align themselves perpendicular to the electric field. However, since the orientation force of the orientation layers 91 and 92 is greater than the force of the electric field in areas in proximity to the two substrates 10 and 20, the liquid crystal molecules 51 in these regions attempt to maintain their original positions. Accordingly, the direction of the liquid crystal molecules 51 varies continuously in an attempt to realize an equilibrium between the force of the electric field and the force of the orientation layers 91 and 92.

As a result, as shown in FIGS. 6b and 7b, the liquid crystal molecules 51 are arranged in different configurations according to a viewing direction. With reference to FIG. 6b, because of the intervals between the first electrodes 30, the electric field between two adjacent first electrodes 30 is slanted inwardly when observed from viewing direction 1. This leads to the liquid crystal molecules 51 being symmetrically arranged about a center line A between two first electrodes 30, and two regions of symmetrically arranged liquid crystal molecules 51 being formed between adjacent first electrodes 30. As a result, as shown in FIG. 6b, a phase retardation of the light passing through the liquid crystal layer 50 is symmetrically compensated for so that the viewing angle is increased.

Referring now to FIG. 7b, when observed from viewing direction 2 of FIG. 5, the liquid crystal molecules 51 are slanted or twisted such that the liquid crystal molecules 51 are arranged symmetrically on both sides of a center line B to form two regions, the center line B being positioned at approximately a center location between the two substrates 10 and 20 and parallel to the same. As a result, a phase retardation of the light passing through the liquid crystal layer 50 is symmetrically compensated for so that the viewing angle is increased.

The liquid crystal molecules 51 can form a non-moving layer at the center line B. That is, the liquid crystal molecules 51 are symmetrically arranged on both sides of the center line B, and the light transmitted diagonally with respect to the center line B follows paths realized by the identical arrangement of the liquid crystal molecules. As a result, a retardation of the light is also roughly identical in all areas such that a wide viewing angle is achieved.

Figure 8:
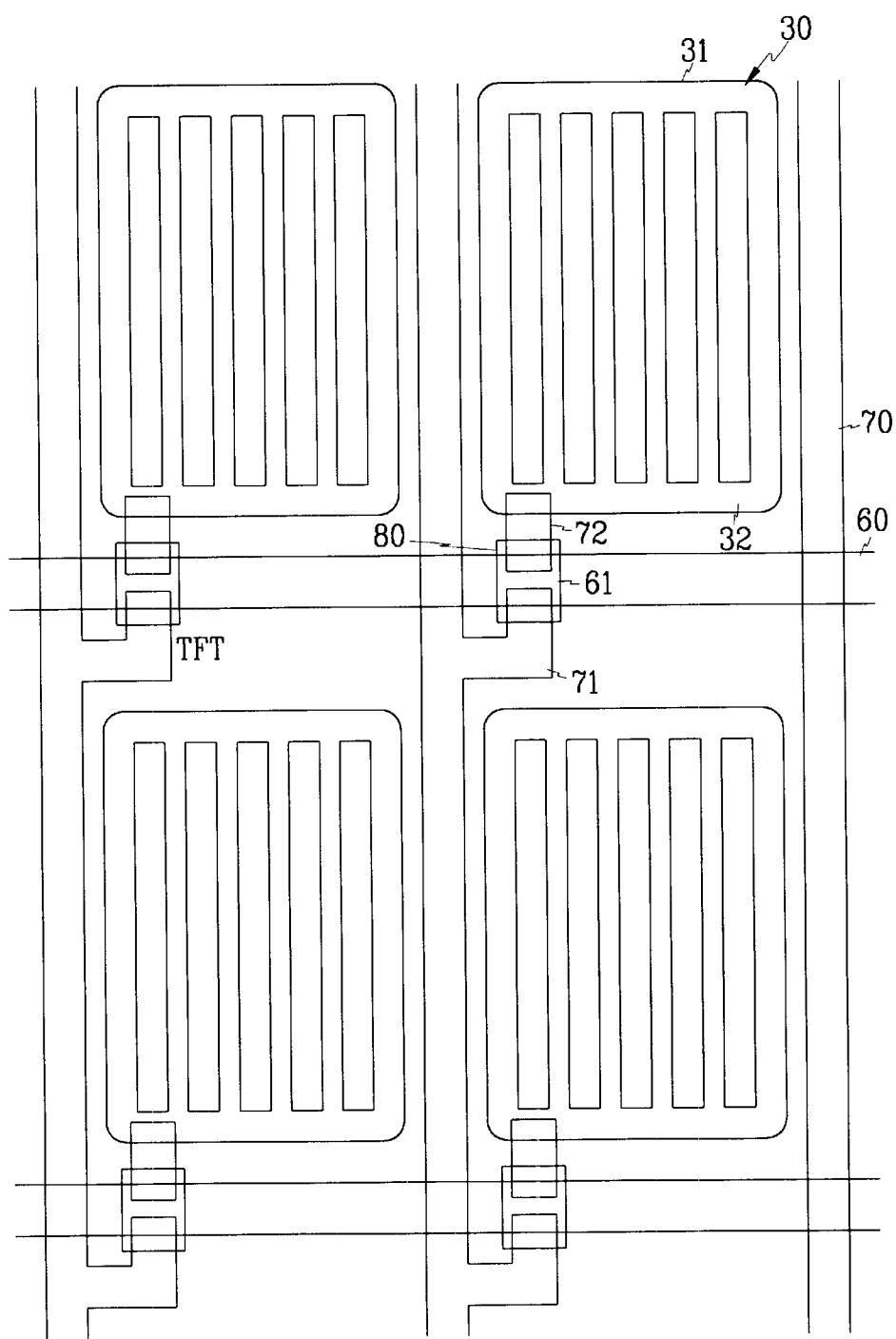
FIG. 8 is a schematic view of a thin film transistor substrate used by a liquid crystal display according to a second preferred embodiment of the present invention.

A unit pixel structure of a thin film transistor substrate for an LCD of the second embodiment in which the first and second electrodes 30 and 40 are respectively a pixel electrode and a common electrode will now be described with reference to FIG. 8.

The TFT substrate according to the second embodiment is substantially the same as the first embodiment. However, the first electrodes 30, which are formed in each pixel region and electrically connected to a corresponding drain electrode 72 to transmit image signals, have a slit structure as described above. The first electrodes 30 (pixel electrodes) are connected to a corresponding drain electrode 72 via a pixel electrode line 32. The first electrodes 30 can be formed in either the horizontal or vertical direction (in the drawing), and at different directions in each pixel regions.

In the liquid crystal display of the present invention described above, vertically-aligned liquid crystal molecules are oriented in the same direction or form two symmetrical regions on both sides of a center line between the two substrates such that there is a symmetrical compensation in the retardation of transmitted light, thereby obtaining a wide viewing angle. Also, as a result of the projections, a uniform viewing angle is obtained and gray inversion problems are avoided.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:
   a first substrate including a first electrode;
   a second substrate including a second electrode, said second substrate being arranged substantially in parallel with said first substrate and with a predetermined gap therebetween;
   a liquid crystal layer formed by injecting liquid crystal material between said first substrate and said second substrate, long axes of liquid crystal molecules of said liquid crystal layer being arranged vertically to said first substrate and said second substrate, wherein only a portion of the long axes of the liquid crystal molecules in the liquid crystal layer are arranged in a substantially radial configuration;
   a first orientation layer formed on said first substrate, and arranging the liquid crystal molecules such that the long axes of the liquid crystal molecules are slanted or twisted from normal when applying an electric field; and
   a second orientation layer formed on said second substrate and arranging the liquid crystal molecules such that the long axes of the liquid crystal molecules are slanted or twisted from normal when applying an electric field.

2. The liquid crystal display of claim 1, wherein orientation directions of said first orientation layer and said second orientation layer are identical.

3. The liquid crystal display of claim 1, wherein orientation directions of said first orientation layer and said second orientation layer are different.

4. The liquid crystal display of claim 1, wherein the liquid crystal layer has a negative dielectric anisotropy.

5. The liquid crystal display of claim 1, wherein a polarizing film for polarizing light is provided on outer surfaces of each of said first substrate and said second substrate.

6. The liquid crystal display of claim 5, wherein a light transmission axis of polarizing film on said first substrate is either perpendicular to or parallel to a light transmission axis of polarizing film on said second substrate.

7. The liquid crystal display of claim 1, wherein the first electrode is patterned in a slit configuration in a single direction.

8. The liquid crystal display of claim 7, wherein the first electrode is arranged in a direction corresponding to an orientation direction of the liquid crystal molecules.

9. The liquid crystal display of claim 7, wherein the first electrode is arranged in a direction that is different from an orientation direction of the liquid crystal molecules.

10. The liquid crystal display of claim 9, wherein an angle between a longitudinal direction of the first electrode and the orientation direction of the liquid crystal molecules is 0 to 10°.

11. The liquid crystal display of claim 10, wherein the first electrode is a pixel electrode for transmitting image signals, and is formed in each unit pixel area.

12. The liquid crystal display of claim 11, further comprising a tin film transistor, the thin film transistor including a gate line for transmitting scanning signals; a data line for transmitting image signals, and being insulated from and intersecting the gate lines to form a pixel region; a gate electrode provided at areas where the gate line and the data line cross, and being connected to the gate lines; a source electrode connected to the data line; and a drain electrode connected to the pixel electrode.

13. The liquid crystal display of claim 12, wherein the pixel electrode is formed on a same layer as the gate line or the data line.

14. The liquid crystal display of claim 12, wherein the pixel electrode is made of a transparent conductive material such as indium tin oxide or indium zinc oxide, or are made of a non-transparent conductive material.

15. The liquid crystal display of claim 12, wherein the pixel electrode is arranged in the same direction as the data line or the gate line.

16. The liquid crystal display of claim 1, wherein protrusions are formed on at least one of the first substrate and the second substrate for providing a pretilt angle.

17. The liquid crystal display of claim 16, wherein an angle between a surface of the plurality of protrusions and a surface of at least one of the first substrate and the second substrate, respectively, is approximately 2° to 45°.

18. The liquid crystal display of claim 17, wherein the protrusions are formed on substantially corresponding areas of the first substrate and the second substrate.

19. The liquid crystal display of claim 1, wherein a chiral additive is added in the liquid crystal material forming the liquid crystal layer.

20. The liquid crystal display of claim 1, wherein the first electrode and the second electrode are made of a transparent conductive material such as indium tin oxide or indium zinc oxide, or are made of a non-transparent conductive material.

21. A liquid crystal display, comprising:
   a first substrate and a second substrate, the second substrate being arranged substantially in parallel with the first substrate and with a predetermined gap therebetween;
   a liquid crystal layer formed by injecting liquid crystal material between the first substrate and the second substrate, long axes of liquid crystal molecules of the liquid crystal layer being arranged vertically to the first substrate and the second substrate at an initial state, wherein only a portion of the long axes of the liquid crystal molecules near one of the first substrate and the second substrate are arranged in substantially a radial configuration; and
   a plurality of objects for varying an alignment of the long axes of the liquid crystal molecules, wherein at least two adjacent regions with respect to a line parallel to the first substrate and the second substrate are formed by the liquid crystal layer, and the regions are formed substantially symmetric.

22. The liquid crystal display of claim 21 wherein at least two adjacent regions with respect to a line vertical to the first substrate and the second substrate are formed by the liquid crystal layer, and the regions are formed symmetrically.

23. The liquid crystal display of claim 1, wherein the plurality of the liquid crystal molecules adjacent to the plurality of protrusions is arranged in a radial shape.

24. The liquid crystal display of claim 1, wherein the plurality of the liquid crystal molecules adjacent to the plurality of protrusions is arranged in a radial shape when applying electric field.

25. The liquid crystal display of claim 22, wherein the plurality of objects and the plurality of the liquid crystal molecules adjacent to the plurality of objects is arranged in a radial shape.

26. A liquid crystal display, comprising:
   a first substrate including a first electrode, wherein the first electrode has a plurality of slits in a single direction;
   a second substrate including a second electrode, said second substrate being arranged substantially in parallel with said first substrate and with a predetermined gap therebetween;
   a liquid crystal layer between said first substrate and said second substrate having liquid crystal molecules, wherein only a portion of the liquid crystal molecules have long axes arranged in a substantially radial configuration with respect to that portion of liquid crystal molecules and another portion of the liquid crystal molecules have long axes arranged in a substantially vertical configuration relative to said first substrate and said second substrate;
   a first orientation layer formed on said first substrate, and arranging the liquid crystal molecules such that the long axes of the liquid crystal molecules are slanted or twisted from normal; and
   a second orientation layer formed on said second substrate and arranging the liquid crystal molecules such that the long axes of the liquid crystal molecules are slanted or twisted from normal.

27. The liquid crystal display of claim 26, wherein the plurality of slits are arranged in a direction substantially parallel to an orientation direction.

28. The liquid crystal display of claim 26, wherein the plurality of slits are arranged in a direction substantially perpendicular to an orientation direction.

29. The liquid crystal display of claim 26, wherein a plurality of protrusions formed on at least one of said first substrate and said second substrate arranged for providing a pretilt angle.

30. The liquid crystal display of claim 29, wherein the plurality of protrusions have an inclination angle in the range of about 2°–45° relative to at least one of said first substrate and said second substrate.

31. The liquid crystal display of claim 30, wherein the plurality of protrusions are arranged in a random order on at least one of said first substrate and said second substrate.

32. The liquid crystal display of claim 30, wherein the plurality of protrusions are arranged in substantially corresponding locations on said first substrate and said second substrate.

* * * * *